United States Patent [19]

Vani et al.

[11] 4,201,045
[45] May 6, 1980

[54] FUEL LIMITER FOR COMBUSTION TURBINES

[75] Inventors: Elo N. Vani, Cherry Hill, N.J.; Roy W. Kiscaden, Morton, Pa.

[73] Assignee: Westinghouse Electric Corp., Pittsburgh, Pa.

[21] Appl. No.: 935,430

[22] Filed: Aug. 21, 1978

[51] Int. Cl.² .............................................. F02C 9/04
[52] U.S. Cl. .......................... 60/39.09 R; 60/39.28 R; 60/39.46 P
[58] Field of Search ............... 60/39.09 R, 39.28, 223, 60/39.46 P

[56] References Cited

U.S. PATENT DOCUMENTS

| | | | |
|---|---|---|---|
| 2,641,105 | 6/1953 | Drake | 60/39.09 R |
| 3,025,670 | 3/1962 | Russ | 60/39.28 |
| 3,342,031 | 9/1967 | Beavers | 60/39.28 |
| 3,759,037 | 9/1973 | Kiscaden | 60/39.28 |
| 3,987,620 | 10/1976 | Giordano et al. | 60/39.28 |

*Primary Examiner*—Louis J. Casaregola
*Attorney, Agent, or Firm*—E. F. Possessky

[57] ABSTRACT

A signal representative of liquid fuel flow or gaseous fuel pressure is compared to a limit value throughout the startup and load operation of a combustion turbine. Under predetermined fuel supply conditions the turbine is either alarmed or tripped. The fuel limit value is a function of combustor shell pressure and altitude.

6 Claims, 3 Drawing Figures

FUEL LIMITER FOR COMBUSTION TURBINES

BACKGROUND OF THE INVENTION

The present invention relates to combustion turbines and more particularly to systems for limiting the energy input to the turbine for safety and product protection purposes.

The fuel flow to a combustion turbine can vary rapidly as the turbine is being controlled to satisfy startup or load requirements. In turn, large and rapid fuel flow variations can have a large effect on temperature variation of the turbine blades and other engine parts. It is desirable to limit fuel flow to limit turbine temperature swings and thereby reduce cyclic thermal stress damage to the turbine, especially during acceleration to synchronous speed.

Thermocouples have been employed to monitor turbine temperature with limit control action being taken when required. However limit action based on thermocouple temperature detection is based on temperature increases which would already have occurred and which accordingly already have shocked the turbine. Further, thermocouple devices must have sufficient mass to be durable and reliable in the turbine environment, and the time constant associated with such mass places a delay on any potential limit action. It has also often been the practice only to monitor fuel pressure or flow during the 10 to 15 second ignition period to detect a possible catastrophic throttle valve failure after ignition and successful valve operation.

SUMMARY OF THE INVENTION

A fuel limiter for a combustion turbine includes means for generating a fuel signal based on fuel pressure or fuel flow and comparing the fuel signal to a reference limit. Means are provided for generating the reference limit as a function of combustor shell pressure preferably throughout the range of turbine startup and loading operation. Means are provided for generating an alarm or a turbine trip according to the output from the comparing means. If desired, valve control means can be provided for limiting fuel flow during alarm conditions. In operation, the fuel limiter avoids damaging energy releases within the turbine combustors by anticipatorily preventing excessive fuel flow.

DESCRIPTION OF THE PREFERRED EMBODIMENT

Figure 1:
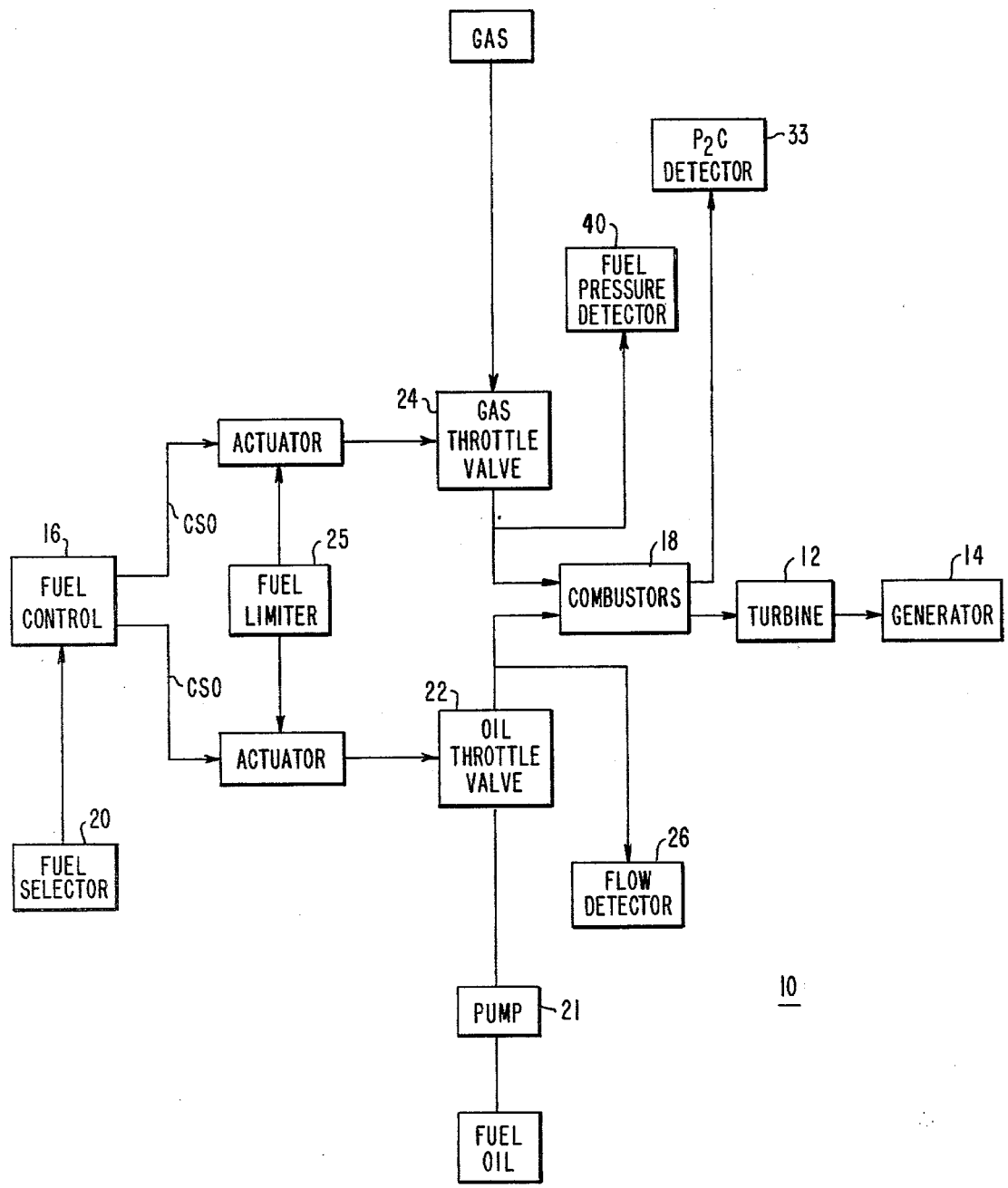
FIG. 1 shows a schematic view of a combustion turbine system in which a fuel limiter is embodied in accordance with the principles of the invention.

More particularly, there is shown in FIG. 1 a combustion turbine power plant 10 having a combustion turbine 12 which drives an electric generator 14 under the control of a fuel control 16. In this case, either liquid fuel oil or fuel gas may be burned in turbine combustors 18 according to the operator selection made through a fuel selector 20.

Liquid fuel oil is supplied to the combustors by a pump 21 through a throttle valve 22. Fuel gas is supplied from a pressurized source through a throttle valve 24. In each instance, a fuel control signal CSO operates the gas or oil throttle valve actuator to position the valve in accordance with the fuel demand as the turbine 12 is accelerated in accordance with a startup schedule and subsequently loaded.

The fuel control 16 can be any suitable type, and is preferably the electronic type embodied with analog and/or digital hardware with or without software programming. The need for fuel limit action occurs when the fuel demand required to satisfy startup or loading requirements would result in excessive energization of the combustors and resultant thermal shock to the turbine blades and other metal turbine parts.

In accordance with the present invention, a fuel limiter 25 continuously generates a maximum fuel limit based on operating conditions. The turbine is preferably held at existing fuel, or alarmed or tripped according to the relationship of actual fuel to the maximum fuel limit.

Figure 2:
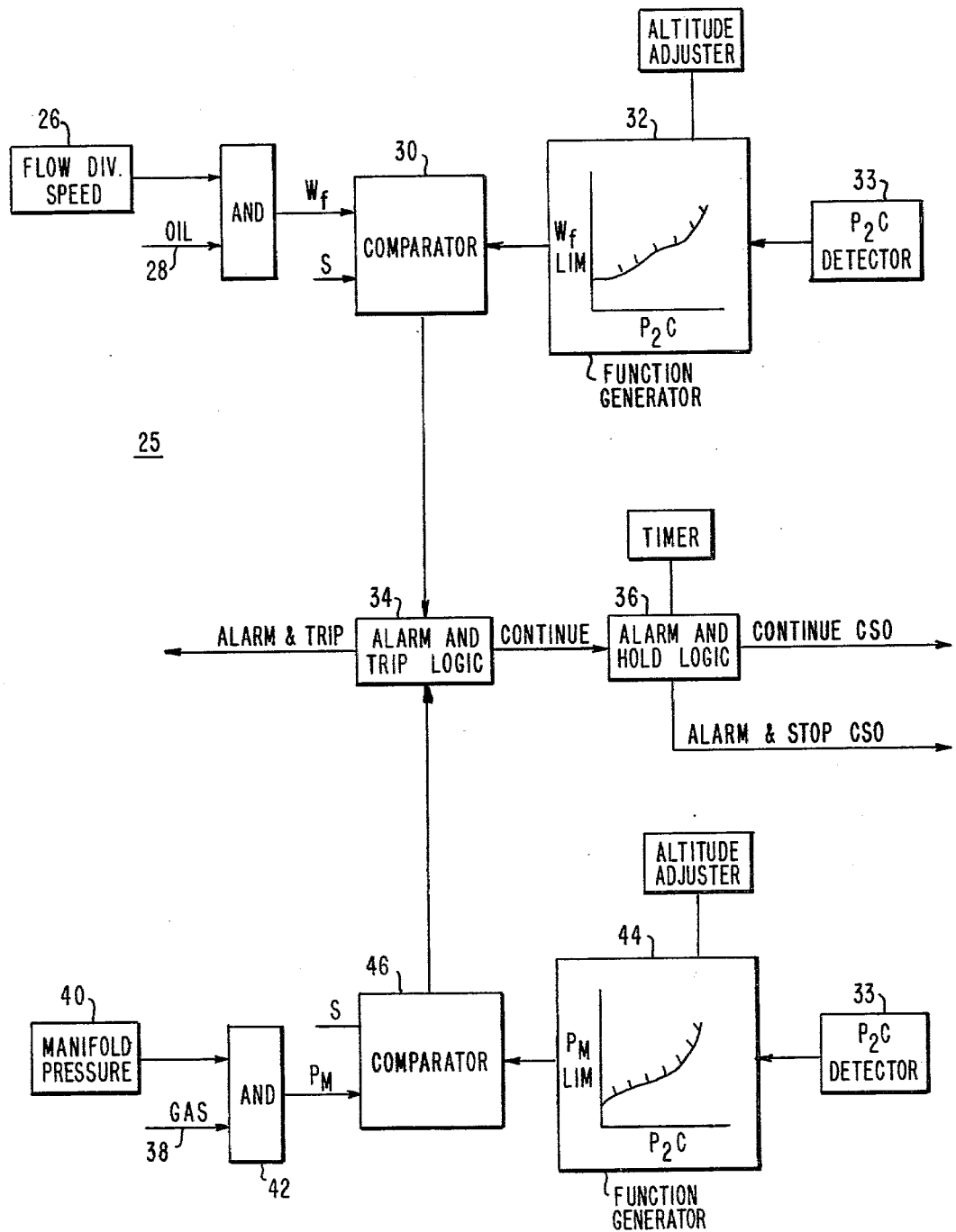
FIG. 2 shows a more detailed functional block diagram of the new fuel limiter system.
Figure 3:
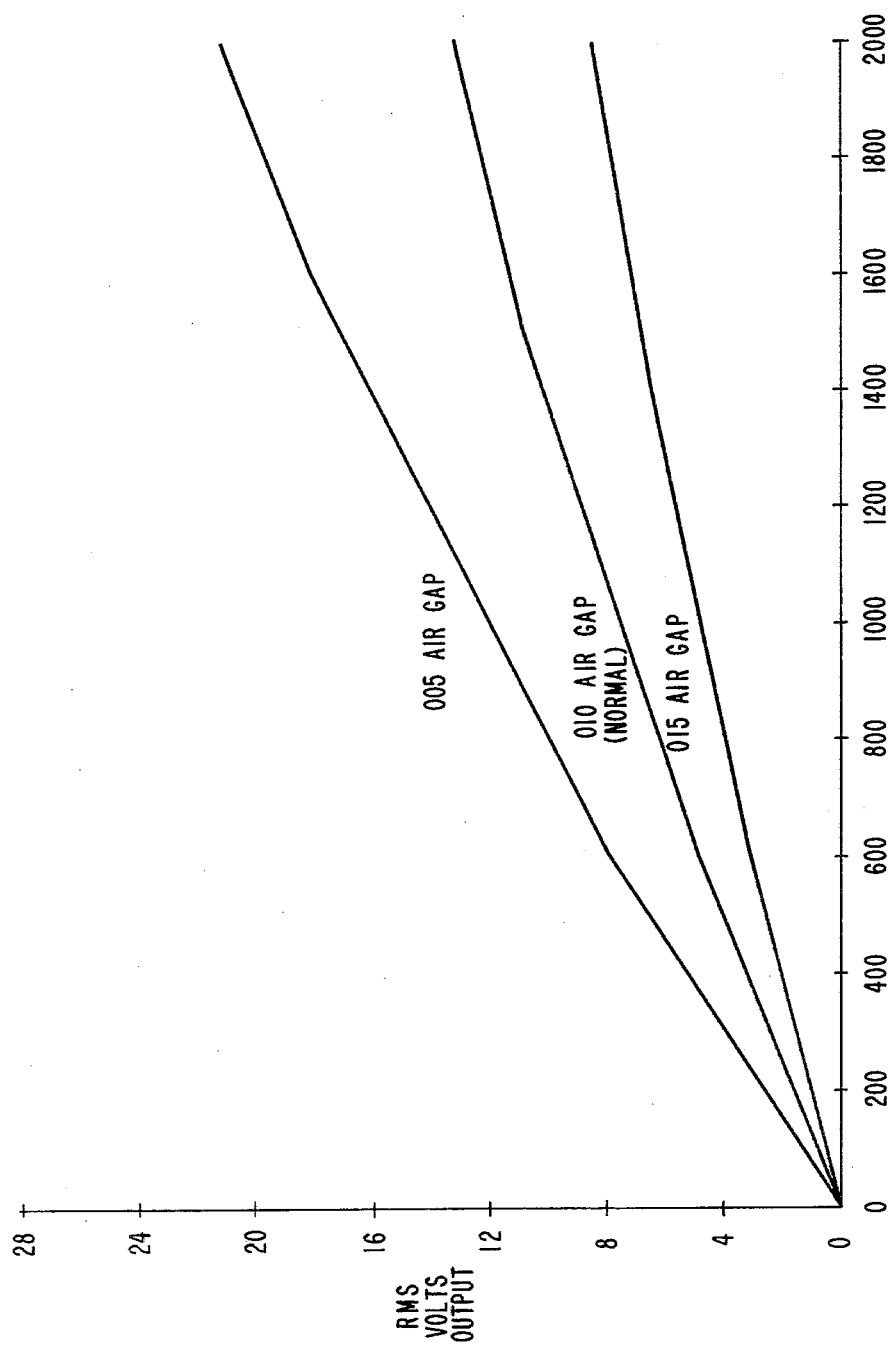
FIG. 3 shows a calibration curve for a fuel flow sensor employed in the fuel limiter.

The fuel limiter 25 is shown in greater detail in FIG. 2. When fuel oil has been selected, as indicated by signal 28, the fuel flow signal is generated by a flow detector 26 which is preferably in the form of a conventional flow divider calibrated in accordance with the curves shown in FIG. 3. The relationship of frequency to flow is 10.6 Hz per gallon per minute.

Turbine fuel flow is measured by totalling flow divider speed which has a direct relationship to fuel flow. A separate pick up is supplied on the flow divider and it is preferably used exclusively for this control. AND block 30 applies the flow signal to a comparator 30 when oil is selected.

A reference generator circuit 32, which can be a conventional electronic function generator, generates a maximum liquid fuel limit as a predetermined function of combustor shell pressure $P_2C$ from detector 33. Generally, as the combustor shell pressure rises, a higher fuel flow maximum limit is permissible.

The oil fuel limit reference is applied to the comparator 30. The difference between the actual fuel flow and the maximum limit is applied to alarm and trip logic 34 which alarms and trips the turbine if the fuel limit has been exceeded. If the actual fuel is less than the 90% limit, no action is required nor initiated. If the actual fuel flow exceeds 90% of the limit, the CSO signal is held and an alarm is generated. If the situation corrects itself, the alarm is cleared and the turbine continues to accelerate. Preferably, the turbine is tripped if the condition is not cleared within a fixed time period such as 60 seconds. If the actual fuel flow exceeds the 100% limit, the turbine is also tripped.

When fuel gas has been selected as indicated by signal 38, a manifold gas pressure signal generated by a pressure detector 40 is applied to AND block 42. A reference generator circuit 44 generates a maximum fuel gas limit as a predetermined function of combustor shell pressure $P_2C$ from the detector 33. Basically, the fuel limit characteristic in the block 44 or 32 is predetermined from fuel energy content considerations and turbine design considerations including allowable metal temperature rise as combustor shell pressure rises.

The fuel gas limit and the fuel gas pressure signal are applied to the alarm and trip logic 34 and subsequently processed in the manner previously described.

On turbine units using gas and liquid fuels, both the gas and the liquid oil limit controls are active during transfer. Once the transfer is completed, the protection limit for the fuel used prior to the transfer may be removed.

Altitude compensation is also employed for the limit curves. There is preferably employed a linear relationship of increasing fuel limit to increasing altitude of 1.0 to 0.7 for an altitude of 0 to 10,000 feet. This is a fixed value component selected for the site or a variable parameter that is set at the site in the function generators 32 and 44.

As a result of operation of the invention, better cost effective control is placed on fuel flow variation and extended turbine life can be achieved.

What is claimed is:

1. A fuel limiter for a combustion turbine fuel valve control comprising means for generating a signal representative of the combustor shell pressure, means for generating a signal representation of the rate at which fuel is being supplied to the turbine, means for generating a fuel limit as a function of the combustor shell pressure, means for comparing the fuel signal and the fuel limit, and means for generating at least one control signal when the fuel signal and fuel limit are related to each other in a predetermined manner.

2. A fuel limiter as set forth in claim 1 wherein the fuel is liquid and said fuel signal generating means includes means for detecting the fuel flow.

3. A fuel limiter as set forth in claim 1 wherein the fuel is gaseous and said fuel signal generating means includes means for detecting the gas manifold pressure.

4. A fuel limiter as set forth in claim 1 wherein means are provided for tripping the turbine and said control signal generating means operates said tripping means when the fuel signal equals the fuel limit.

5. A fuel limiter as set forth in claim 1 wherein means are provided for holding the fuel control to maintain existing fuel flow, and said control signal generating means operates said holding means when the fuel signal equals a value within a predetermined range of values immediately below the fuel limit.

6. A fuel limiter as set forth in claim 1 wherein said fuel limit generating means includes adjustment means for altitude.

* * * * *

Dedication 4,201,045.—*Elo N. Vani*, Cherry Hill, N.J. and *Roy W. Kiscaden*, Morton, Pa. FUEL LIMITER FOR COMBUSTION TURBINES. Patent dated May 6, 1980. Dedication filed Oct. 28, 1981, by the assignee, *Westinghouse Electric Corp.*

Hereby dedicates to the Public the entire term of said patent.

[*Official Gazette September 14, 1982.*]